United States Patent [19]

Saleeba

[11] Patent Number: 4,607,856
[45] Date of Patent: Aug. 26, 1986

[54] COMBINATION CART AND BOAT BOARDING STEPS

[76] Inventor: Wallace T. Saleeba, 33 Curtis St., East Providence, R.I. 02914

[21] Appl. No.: 826,631

[22] Filed: Feb. 6, 1986

[51] Int. Cl.⁴ ............................................. B62B 1/20
[52] U.S. Cl. .................................. 280/47.18; 182/33; 182/46; 280/47.21; 280/47.26; D34/24
[58] Field of Search ................ 182/20, 33, 35, 46, 182/82; D34/24; 280/47.18, 47.26, 164 R, 47.24, 47.21

[56] References Cited

U.S. PATENT DOCUMENTS

| | | | |
|---|---|---|---|
| 524,210 | 8/1894 | Peter | 280/47.18 |
| 1,298,905 | 4/1919 | Dallman et al. | 280/47.18 |
| 2,269,834 | 1/1942 | Wagner | 182/35 X |
| 2,484,227 | 10/1949 | Houk et al. | 280/35 |
| 2,622,658 | 12/1952 | Morgan | 182/35 X |
| 2,843,393 | 7/1958 | Dahlander, Sr. | 280/47.18 |
| 3,041,084 | 6/1962 | Stehman et al. | 280/47.24 |
| 3,984,144 | 10/1976 | Steinbrecher | 182/33 X |
| 4,456,094 | 6/1984 | Brander | 280/47.18 X |
| 4,537,282 | 8/1985 | Lobdell | 182/46 |

Primary Examiner—John J. Love
Assistant Examiner—Michael Mar
Attorney, Agent, or Firm—Dowell & Dowell

[57] ABSTRACT

A combination cart and boat boarding steps wherein a wheeled cart includes a load carrying body portion which when inverted is shaped to provide steps for use in boarding marine craft which are tied at dockside and wherein the steps may be selectively and securely locked to the dock to prevent any unsafe shifting of the steps with respect to the marine craft being boarded by use of the steps.

14 Claims, 6 Drawing Figures

COMBINATION CART AND BOAT BOARDING STEPS

BACKGROUND OF THE INVENTION

1. Field of the Invention

This invention is generally directed to both safety and convenience devices for use in marinas or along docks where pleasure craft are docked or tied and specifically to a combination of an article carrying cart which can be utilized by boat or small craft owners to transport articles from a land based store or parking lot to their boat and thereafter be utilized to form a stairway which will provide a convenient and safe means for boarding their boats from the dock.

2. History of the Prior Art

In marinas and other public and private docking areas, it is often difficult for boat owners or operators to transport supplies, tools, belongings, equipment or other articles to and from boats which are anchored or tied along the docks which provide access to the boats in the water. In many commercial marinas or boat yards, wheelbarrows, wagons or carts are provided for use of boat owners so that various goods and articles can be transported between their automobiles and boats which are tied along dockside. The use of such mobile carts to facilitate the movement of goods not only from private vehicles but from supply stores near the marina or docks has been growing in acceptance over recent years.

An inherent problem with boarding boats which are tied along docks is that frequently the tide or water level creates a situation where the boat or water craft is raised substantially above the level of the dock thereby making access to the boat extremely difficult. This situation is made additionally awkward when considering that the person boarding the craft may be carrying heavy packages, articles or goods. In addition, if there is any tidal movement or wave motion in the area adjacent to the docks, such action will cause a rocking motion of the boat which further makes boarding more difficult especially when the boat has been elevated by high tides or high water levels.

Likewise, at low water levels or low tides, persons coming into a dock area may encounter substantial difficulty in unloading various articles or supplies from their boats to the dock area as the water level may be such that the deck of the boat is substantially below the dock thereby necessitating that loads be lifted and passed to persons on the dock. Further, a difference in height between a boat deck and a dock may make passage therebetween unsafe especially for small children and senior or handicapped adults.

Although there has been some prior art development in the field of convertible dollies and other carts into other useful structures such as stepladders or seats which can be used upon various water craft, there has been no recognition for the need to provide a transport cart for carrying goods along a dock wherein the cart could also serve as a secure staircase for both boarding a vessel tied at dockside as well as being utilized under certain conditions for disembarking the vessel.

As the movement of articles and goods along a boarded dock can be difficult, and as access to water craft is often precariously unsafe, the provision of means for providing safe access to water craft which means may also be used to assist in the transporting of goods to and from a boat could be of extreme benefit to the boating public.

SUMMARY OF THE INVENTION

This invention is directed to a combination cart and boat boarding steps wherein a wheeled cart is provided having a load carrying bin which when inverted is shaped to provide a generally conventionally dimensioned staircase which may include an uppermost platform and one or more steps. The cart is designed to be securely locked to the spaced planks which form the surface of a marina or boat dock when inverted for use as a staircase. In one embodiment of the invention, the wheels may be pivotably shifted so as to be set aside when the cart is inverted for use as a staircase while in another embodiment of the invention, the wheel assembly may be selectively removed and housed beneath the inverted body portion of the cart when not in use.

It is the primary object of the present invention to provide a combination article and material handling cart which can be utilized by boat owners to move supplies and goods from a land base area such as a parking lot or store to a boat or water craft which is tied or anchored along a dock wherein the cart may be utilized along the dock area to form a staircase or steps for either providing safe access into the boat or water craft or for assisting disembarkation of persons from the water craft to the dock.

It is another object of the present invention to provide a light weight cart which may be easily manipulated by boat owners to transport various articles, goods and supplies from one point to another along a boat dock and which can be utilized adjacent a boat tied along dockside to form a staircase which can be securely engaged with the dock so that the staircase could not be accidentally moved during use and thereby provide a safe and secure access to a boat tied to the dock.

It is also an object of the present invention to provide a low cost means for enabling small pleasure craft and other boat owners to not only have a means for transporting various goods and articles including personal belongings between their boats and awaiting vehicles or other storage areas but which also provides a unit which can function as a seat or stand when not in use on a boat deck or serve as a secure staircase to enable persons on a boat to step to a dock area without requiring undue physical dexterity to be exerted on the part of the person leaving the boat.

It is yet another object of the present invention to provide a combination article carrying cart and boat boarding steps which will provide both a more safe and convenient means for accessing or disembarking water craft especially for the less physically capable.

It is yet another purpose of the present invention to provide a combination article carrying cart and boat step or ramp which will be of low cost and of such a size that the unit may be easily disassembled for storage either on a boat or in a car or other storage area so that the combination cart and steps may be utilized easily by a boat owner to provide an easy and safe means for entering or exiting the boat while simultaneously providing a cart which can be utilized to move goods to and from a boat tied at dockside.

DESCRIPTION OF THE PREFERRED EMBODIMENT

Figure 1:
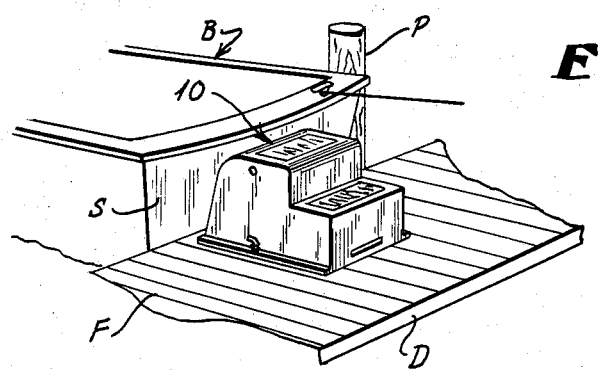
FIG. 1 is an illustrational view showing the combination cart and steps of the present invention as the cart is inverted for use as steps and locked to the decking of the dock adjacent the stern of a boat.
Figure 2:
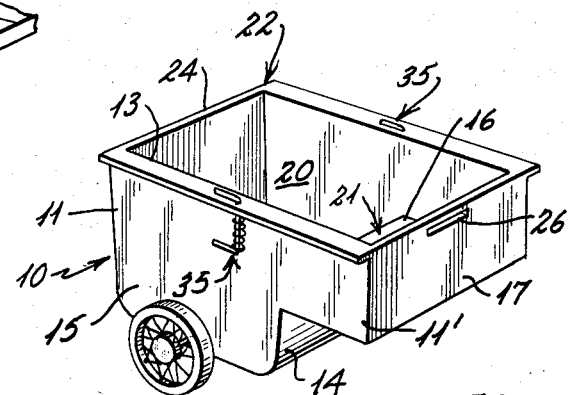
FIG. 2 is a perspective view of one embodiment of the cart of the present invention.

With continued reference to the drawings, the combination cart and boat boarding steps 10 of the present invention are shown in FIG. 2 as the cart is prepared for accepting a load of goods or articles which may be transported from one area to another and particularly from a land based area or point to a boat B which is tied along a dock D. With specific reference to FIG. 1, the stern portions of the boat B is shown as it is tied adjacent the pilings P of the dock D with the combination cart and boat boarding steps 10 being shown in an inverted relationship along the surface of the dock.

The combination cart and boat boarding steps 10 includes a housing having a main or first body portion 11 and a secondary body portion 11'. The main body portion includes a lower surface 12, rear wall 13, intermediate front wall 14 and opposite side wall portions 15 and 15'. The secondary body portion 11' is of reduced volume with respect to the first body portion and is integrally formed or associated therewith and includes an intermediate lower wall 16, front wall 17 and spaced side wall portions 18 and 19. The side walls 18 and 19 are generally formed so as to be coextensive and integrally formed with the side walls 15 and 15' of the first body portion of the cart. In this manner, the interior of the cart is formed into two separate wells generally identified at 20 and 21. Well 20 is substantially greater in volume and extends from the upper peripheral edges 22 of the cart to the lowermost surface 12 thereof whereas the well 21 extends from the upper peripheral edges to the secondary or intermediate lower wall 16.

Figure 3:
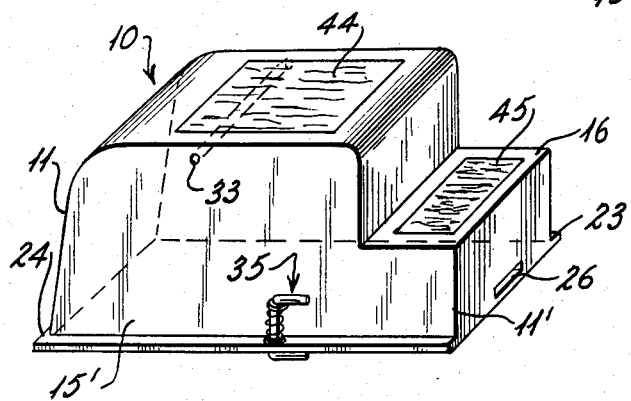
FIG. 3 is a perspective view of the cart of FIG. 2 shown in an inverted position forming a secure staircase having the wheels removed for purposes of safety.

The upper peripheral edges 22 of the cart are shown as including being outwardly extending flanges along the sides and rear wall of the cart. The flanges are identified by numerals 23 and 24, respectively. The flanges form substantially planar support surfaces which can be used for stability when the cart is overturned or placed in an inverted orientation such as shown in FIG. 3. An opening 26 is provided through the front wall 17 and provides a handle for use in manipulating the cart when the invention is used in the mode of a cart. In order to provide mobility for the cart, a pair of wheels 30 and 31 are shown as being mounted on an axle 32 which is disposed through a molded opening 33 along the lower wall 12 of the cart.

Figure 4:
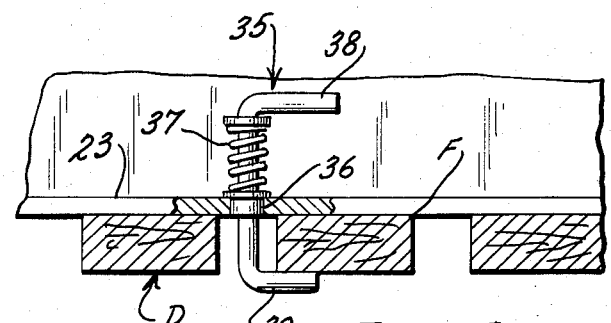
FIG. 4 is an enlarged closeup view of the locking mechanisms provided on each side of the upper edge of the cart of FIG. 2 showing the locking mechanisms as they engage the wooden planks of a dock.

Normally, the cart will be utilized to transport articles or goods from one area to another such as from a person's automobile to their boat which may be tied along a dock. Once the goods have been delivered adjacent to the boat, the goods are removed from the well portions 20 and 21 of the cart and the cart is inverted and placed with the rear wall portion 13 generally facing the stern of the boat as shown in FIG. 1. A pair of spring loaded locks 35 are provided through the flanged upper edge portions 23 of the cart and may be used to secure the cart to the dock when in an inverted position. Each of the locks is shown as having a generally U-shaped locking component which passes through openings 36 in the opposite side flanges of the cart and which are resiliently locked by springs 37. By depressing the upper ends 38 of the U-shaped locking mechanisms against the springs, the locks may be pushed down and twisted so that the end portions 39 thereof engage the lower surfaces of the flooring F of the dock D as shown in FIG. 4.

Once locked into position, the cart is ready for use as a staircase by persons desiring to board the boat from the dock area. As a staircase, the lower wall 12 forms an upper stair or platform while the secondary or intermediate lower wall 16 provides an initial step for access to the boat. It is envisioned that additional steps could be provided by molding or forming the interior configuration of the cart to provide three or more steps.

In regard to the foregoing, it may also be possible to utilize the cart of the present invention to assist in enabling handicapped persons in wheelchairs or persons on crutches or elderly persons to both board and exit water craft which are moored or tied along a dock. In these instances, the step configuration created by lower walls 12 and 16 could be molded or formed to create an upper platform and an inclined ramp. The ramp would be provided in the area of the forward portion of the cart so as to form an incline upwardly to the platform formed by the lowermost surface of the cart when it is in an inverted position. Additional means could be provided to provide a ramp which would be attached adjacent the end wall of the cart and extend into the boat and down to the deck. The ramp would be locked and secured by engagement of the locks 35 to the dock as previously discussed.

Figure 5:
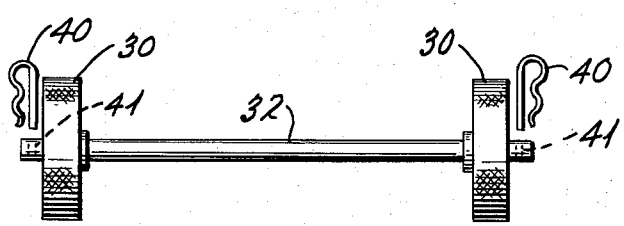
FIG. 5 is a front plan view showing one form of wheel and axle assembly for use with the cart of the present invention.

To facilitate the use of the cart as a staircase when in an inverted position such as shown in FIG. 3, and for safety reasons, the wheels should be removable with respect to the cart so that people will not accidentally step on one of the wheels and slip from the staircase. The wheels may be formed as shown in FIG. 5 utilizing a single axle which is disposed through the opening 33 in the lower portion of the cart and wherein the wheels are secured by cotter pins 40 which are positioned through openings 41 in the outer extremeties of the axle 32. By removing one of the cotter pins, one wheel may be removed and thereafter the axle and other wheel pulled from the opening 33. Thereafter, the wheel components may be placed beneath the cart for storage.

Figure 6:
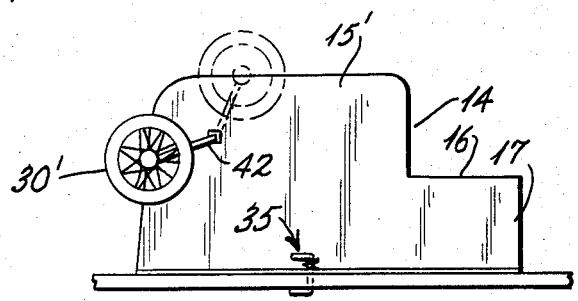
FIG. 6 is an inverted view of the cart of FIG. 2 showing a second type of wheel assembly which may be maneuvered to an out of the way non-use position.

As an alternative to the removable wheel assembly shown in FIG. 5, a repositionable wheel assembly may be provided for use with the cart. The repositionable wheel assembly is shown in FIG. 6 as including a pair of pivotal L-shaped axle members 42 which extend outwardly and vertically from each of the side walls of the cart. By manipulation of the axles, the wheels 30' may be swung out of relationship with respect to the cart and thereby positioned remote from the stepping surface created by the wall portions 12 and 16 when the cart is used as steps.

Although not specifically shown in the drawings, the cart of the present invention may also be used in an inverted relationship within the boat. It is particularly advantageous when the boat is docked at low tide to provide an easy means of stepping from the deck of the boat upwardly to the dock. As the cart is made of a light weight material such as a molded fiber reinforced plastic material, it is easy to place the cart on board the boat. In this manner, the cart could function as a seat when the boat is in use and then may be used alternatively as a step to disembark the boat when at dockside.

Also, although not shown in the drawings, the upper portion of the flanges 23 and 24 may be provided with a non-slipping or frictional material so that when the boat is used without the locking mechanisms 35, the non-slipping material would tend to prevent any slippage of the cart as it is used as a staircase. Also, as an additional feature, rubber or acrylic stair pads 44 and 45 or other types of non-slipping surfaces could be adhesively secured to the outer surfaces of the lower walls 12 and 16 so that when the lower walls are used as steps, such steps are provided with a non-slipping surface.

I claim:

1. The combination of a cart and steps for use with boats tied along docks comprising a housing having side wall portions, a lowermost wall portion having inner and outer surfaces and at least one intermediate lower wall portion having inner and outer surfaces, said intermediate lower wall portion being spaced in vertical relationship with respect to said lowermost wall portion and extending relatively outwardly therefrom and in general parallel relationship thereto, said housing having uppermost edge portions defining an opening therebetween, at least one ground engaging wheel carried by said housing for normally supporting said housing in movable contact with a supporting surface, said housing being invertible so that said upper edge portions thereof support said housing in substantially even contact with a supporting surface, said outer surface of said intermediate lower wall portion defining a first step which is vertically spaced below and adjacent to a second step formed by said outer surface of said lowermost wall portion when said housing is inverted so that said first and second steps may be utilized by an individual to ascend and descend from one supporting surface to another.

2. The combination cart and boat boarding steps of claim 1 including locking means carried by said housing, said locking means having portions for engaging the supporting surface so as to prevent lateral displacement of said housing when placed in an inverted position for use as steps.

3. The combination cart and steps of claim 2 in which said uppermost edge portions include at least two generally parallel spaced flanges which extend outwardly with respect to said opening into said housing and said locking means being mounted through said flanges.

4. The combination cart and steps of claim 3 in which said housing includes a front and rear wall portion extending between said side wall portions and handle means provided adjacent said front wall portion whereby said housing may be manipulated by said handle means when said housing is utilized as a cart.

5. The combination cart and steps of claim 4 in which said intermediate lower wall portion extends from adjacent said front wall of said housing to a depending wall portion which extends generally perpendicularly thereto, said depending wall portion extending between said lowermost wall portion and said intermediate wall portion of said housing.

6. The combination cart and steps of claim 4 including two spaced wheel means, said wheel means being disposed on either side of said housing so as to extend relatively below said lowermost wall portion thereof.

7. The combination cart and steps of claim 6 in which said wheel means are pivotally connected to said housing so as to be movable with respect thereto to a position generally above the lowermost wall portion of said housing so that said wheel means will be below said lowermost wall portion when said housing is placed in an inverted position.

8. The combination cart and steps of claim 6 including an elongated opening formed through said lowermost wall porton of said housing, axle means disposed through said elongated opening, and at least one of said wheel means being removably connected to said axle means.

9. The combination cart and steps of claim 6 in which said flange means extends along at least said side wall portions and said rear wall portion of said housing.

10. The combination cart and steps of claim 3 in which said locking means include substantially U-shaped bolt members having first and second spaced ends which extend outwardly in generally parallel relationship with respect to one another and which are connected by an intermediate portion, said intermediate portion extending through an opening in said flanges, resilient means for normally returning said bolt in a first position with respect to said opening, said bolt means being movable against said resilient areas so that one of said end portions may be moved away from said flanges when said housing is in an inverted position, said one end of said bolt means being selectively rotatable so as to engage the dock whereby said resilient means urges said one end of said bolt means into pressured engagement with the dock.

11. A combination cart and boat boarding steps for use in boarding and disembarking boats tied along docks wherein the cart may be utilized to transport goods and thereafter be inverted to form steps for boarding or disembarking a water craft along a dock comprising a housing, said housing having side wall portions, a lowermost wall portion having inner and outer surfaces, a rear wall portion, a forward facing intermediate wall portion, a front wall portion and an intermediate lower wall portion having upper and lower surfaces extending between said front wall portion and said forward facing intermediate wall portion, a pair of wheel means disposed on opposite sides of said housing so as to support said housing in movable contact with a supporting surface, said housing having uppermost edge portions defining an enlarged opening, locking means carried by said housing adjacent said edge portions for use in locking said housing relative to the dock when said housing is inverted so that the uppermost edge portions thereof are in engagement with the dock, and said outer surfaces of said lowermost and said intermediate lower wall portions defining steps which are vertically spaced with respect to one another when said housing is inverted.

12. A combination cart and boat boarding steps of claim 11 in which said wheel means are removably connected to said housing.

13. The combination cart and boat boarding steps of claim 11 in which said upper edge portions include outwardly extending flanges which extend along each of said side wall portions of said housing, said locking means being carried by said flange and including first and second ends, said second end being selectively engagable with the lower surface of the dock.

14. The combination cart and boat boarding steps of claim 11 including an opening in said front wall, said opening forming a handle for the cart.

* * * * *